United States Patent
Kibre et al.

(10) Patent No.: US 9,947,317 B2
(45) Date of Patent: *Apr. 17, 2018

(54) PRONUNCIATION LEARNING THROUGH CORRECTION LOGS

(71) Applicant: Microsoft Technology Licensing, LLC, Redmond, WA (US)

(72) Inventors: Nicholas Kibre, Redwood City, CA (US); Umut Ozertem, San Carlos, CA (US); Sarangarajan Parthasarathy, Mountain View, CA (US); Ziad Al Bawab, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,350

(22) Filed: Feb. 13, 2017

(65) Prior Publication Data

US 2017/0154623 A1    Jun. 1, 2017

Related U.S. Application Data

(63) Continuation of application No. 14/186,476, filed on Feb. 21, 2014, now Pat. No. 9,589,562.

(51) Int. Cl.
*G10L 15/187* (2013.01)
*G10L 15/07* (2013.01)
(Continued)

(52) U.S. Cl.
CPC .......... *G10L 15/187* (2013.01); *G10L 15/075* (2013.01); *G10L 15/01* (2013.01); *G10L 2015/025* (2013.01)

(58) Field of Classification Search
CPC ................. G10L 15/187; G10L 15/075; G10L 2015/025; G10L 15/01
See application file for complete search history.

(56) References Cited

U.S. PATENT DOCUMENTS 7,389,228 B2    6/2008  Rajput et al.
7,467,087 B1   12/2008  Gillick et al.
(Continued)

OTHER PUBLICATIONS

Yu, et al., "Unsupervised Learning from Users' Error Correction in Speech Dictation", In Proceeding of the International Conference on Spoken Language Processing, Oct. 4, 2004, 4 pages.

(Continued)

*Primary Examiner* — Qian Yang

(57) ABSTRACT

A new pronunciation learning system for dynamically learning new pronunciations assisted by user correction logs. The user correction logs provide a record of speech recognition events and subsequent user behavior that implicitly confirms or rejects the recognition result and/or shows the user's intended words by via subsequent input. The system analyzes the correction logs and distills them down to a set of words which lack acceptable pronunciations. Hypothetical pronunciations, constrained by spelling and other linguistic knowledge, are generated for each of the words. Offline recognition determines the hypothetical pronunciations with a good acoustical match to the audio data likely to contain the words. The matching pronunciations are aggregated and adjudicated to select new pronunciations for the words to improve general or personalized recognition models.

20 Claims, 11 Drawing Sheets

(51) Int. Cl.
  *G10L 15/01*  (2013.01)
  *G10L 15/02*  (2006.01)

(56) References Cited

U.S. PATENT DOCUMENTS

| | | |
|---|---|---|
| 7,590,533 B2 | 9/2009 | Hwang |
| 7,756,708 B2 | 7/2010 | Cohen et al. |
| 9,589,562 B2 | 3/2017 | Kibre et al. |
| 2008/0221890 A1* | 9/2008 | Kurata ............... G10L 15/063 704/251 |
| 2011/0165912 A1 | 7/2011 | Wang et al. |
| 2011/0184730 A1 | 7/2011 | LeBeau et al. |
| 2012/0029904 A1 | 2/2012 | Precoda et al. |
| 2012/0232904 A1* | 9/2012 | Zhu ..................... G10L 15/22 704/254 |
| 2014/0088964 A1* | 3/2014 | Bellegarda ............ G10L 15/063 704/243 |

OTHER PUBLICATIONS

Vertanen, et al., "Recognition and Correction of Voice Web Search Queries", In Proceedings of the International Conference on Spoken Language Processing, Sep. 6, 2009, 4 pages.

McGraw, et al., "Learning Lexicons From Speech Using a Pronunciation Mixture Model", In Proceeding of the IEEE Transactions on Audio, Speech, and Language Processing, vol. 21, Issue 2, Feb. 2013, 10 pages.

U.S. Appl. No. 14/186,476, Office Action dated Aug. 6, 2015, 17 pages.

U.S. Appl. No. 14/186,476, Amendment and Response filed Nov. 6, 2015, 13 pages.

U.S. Appl. No. 14/186,476, Office Action dated Dec. 18, 2015, 22 pages.

U.S. Appl. No. 14/186,476, Amendment and Response filed Apr. 13, 2016, 12 pages.

U.S. Appl. No. 14/186,476, Office Action dated Apr. 27, 2016, 25 pages.

U.S. Appl. No. 14/186,476, Amendment and Response filed Jul. 27, 2016, 14 pages.

U.S. Appl. No. 14/186,476, Office Action dated Aug. 29, 2016, 21 pages.

U.S. Appl. No. 14/186,476, Amendment and Response filed Oct. 12, 2016, 14 pages.

U.S. Appl. No. 14/186,476, Notice of Allowance dated Oct. 24, 2016, 12 pages.

* cited by examiner

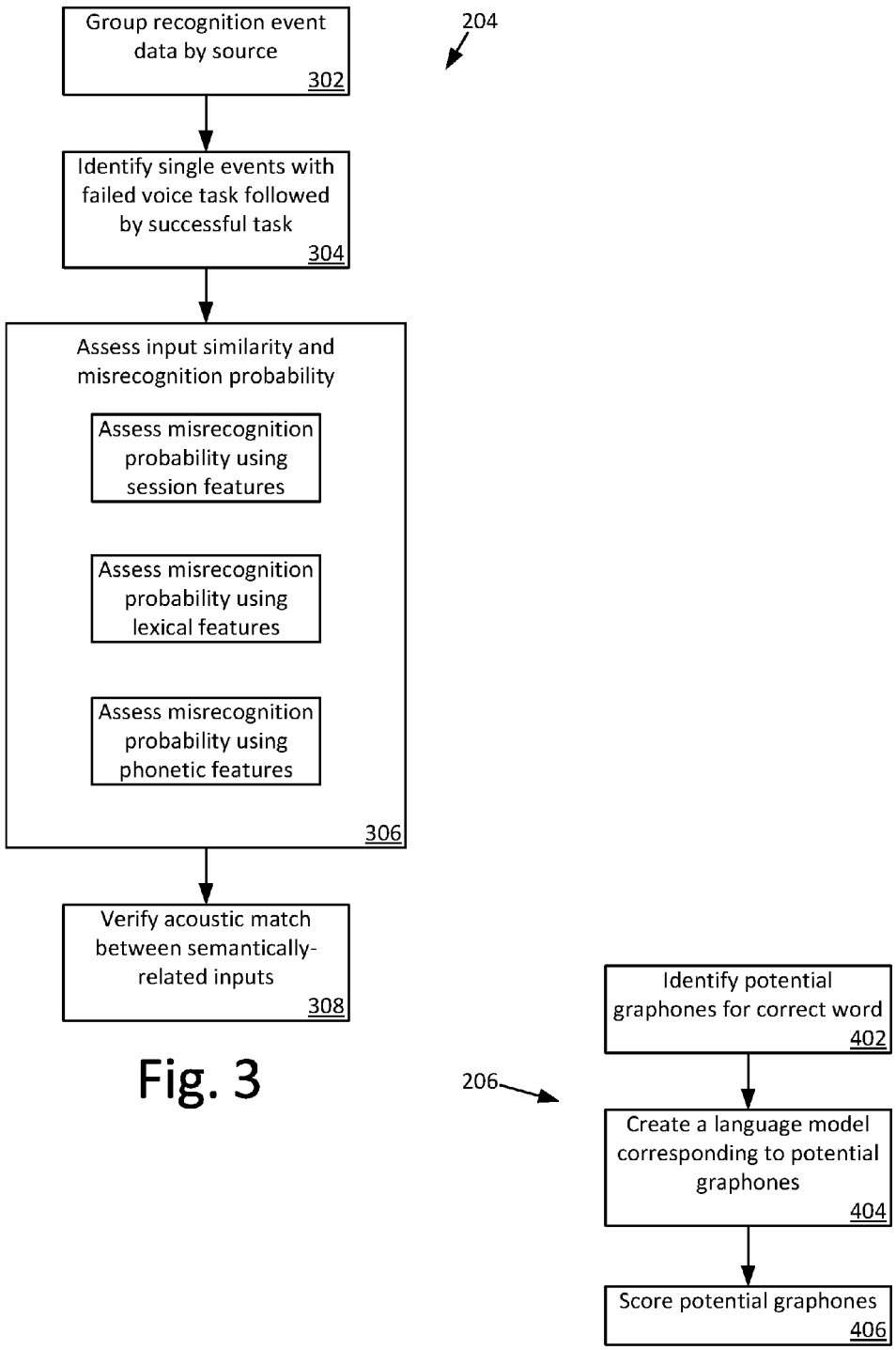

Pronunciation Learning Through Re-Recognition
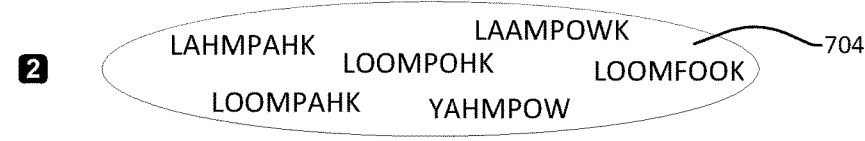
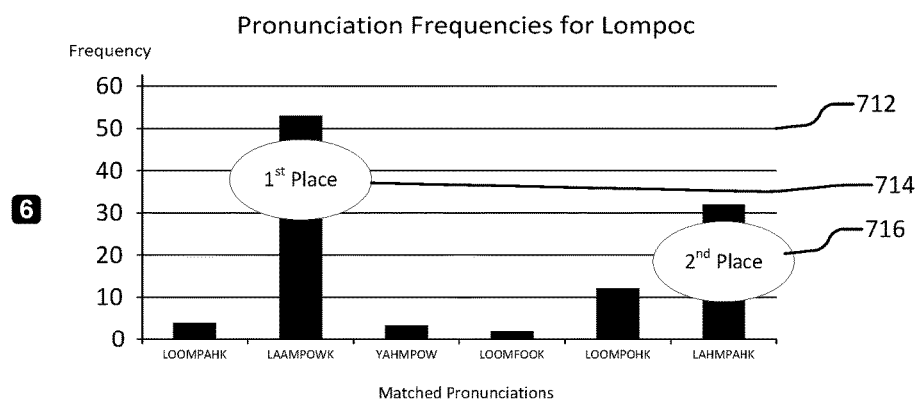
Fig. 7

PRONUNCIATION LEARNING THROUGH CORRECTION LOGS

CROSS-REFERENCE TO RELATED APPLICATIONS

This application is a continuation application of U.S. patent application Ser. No. 14/186,476 (now U.S. Pat. No. 9,589,562), entitled "PRONUNCIATION LEARNING THROUGH CORRECTION LOGS," filed on Feb. 21, 2014, the entire disclosure of which is hereby incorporated herein by reference.

BACKGROUND

Speech recognition systems require accurate pronunciations of words. The language models used by general speech recognition systems to convert spoken audio into text are trained using standard or common pronunciations. However, the general language models may not have appropriate pronunciations for some words. This may be because the existing pronunciations in the language model for a particular word are flawed or the pronunciation for a new or trending word does not exist in the language model. In addition, speaker-specific factors (e.g., a speaker's accent or use of non-standard pronunciations) directly impact the ability of speech recognition systems to properly recognize spoken audio for any given speaker. Further, some words may have unusual pronunciations that have particular relevance, particular in the case of personal names.

In order to improve recognition accuracy, these problematic words must be identified and appropriate pronunciations must be provided. For pronunciation generation, the traditional supervised approach of hiring phoneticians to create them is still standard in the industry.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide for a system and method for dynamically learning new pronunciations for misrecognized words assisted by implicit user-supplied corrections. The new pronunciation learning system builds a corpus of recognition event data containing information related to voice tasks initiated by the user. The recognition event data may include the audio data for the spoken utterance (i.e., the user voice input), the response from the real-time speech recognition system, and subsequent user inputs and selections implicitly confirming or rejecting the accuracy of the recognition and providing confirmation of the words intended by the user's spoken utterance. The collected recognition event data is stored in a central data repository for analysis and used to find new pronunciations for misrecognized words.

Recognition event data is parsed to locate recognition events that are reasonably likely to be associated with a misrecognized spoken utterance and includes subsequent information that may be used to find the user's intended word. For example, the event classification operation bundles subsequent events such as a spoken query without selection of an offered link (i.e., click-through) followed within five seconds by a text query with click-through, identifies words or other linguistic units frequently occurring in the identified events likely to be misrecognized, and associates them with audio data likely to contain spoken utterances of the misrecognized words.

A number of hypothetical pronunciations for a misrecognized word(s) expected to be the embodied in the spoken utterance are generated based on the differences between the decoded voice input and a similar subsequent input. The hypothetical pronunciations may be generated by identifying possible written and phonetic unit pairings for the letters in the correct word. The audio data for misrecognized spoken utterances likely to embody the intended word is re-recognized using a grammar constructed from the hypothetical pronunciations and matched to one or more of the hypothetical pronunciations. The re-recognition results for the instances of the intended word are aggregated and adjudicated to determine the most appropriate pronunciations, if any, to add to a general or personal language model used by a real-time real-time speech recognition system. For statistically relevant numbers of re-recognition results for a misrecognized word, the aggregation and adjudication operation may select the most frequently recognized pronunciation, all pronunciations that are recognized more than a threshold number of times, or all pronunciations that are recognized in more than a threshold percentage of the re-recognition results as being a correct pronunciation. When dealing with small samples or inconclusive re-recognition results, the aggregation and adjudication operation may look for frequently recurring sequences within the matching pronunciations and deduce whether to accept the pronunciation from them.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIG. 3 is a high level flowchart of one embodiment of the event classification operation;

FIG. 4 is a high level flowchart of one embodiment of the pronunciation generation operation;

FIG. 7 graphically illustrates the method of offline pronunciation learning through re-recognition for the scenario of FIG. 6;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a new pronunciation learning system are described herein and illustrated in the accompanying figures. The new pronunciation learning system is an unsupervised system for dynamically learning new pronunciations assisted by user correction logs. The user correction logs provide a record of speech recognition events and subsequent user behavior that expressly or implicitly confirms or rejects the recognition result and/or shows the user's intended words by via subsequent input. The system analyzes the correction logs and distills them down to a set of words which lack acceptable pronunciations. Hypothetical pronunciations, constrained by spelling and other linguistic knowledge, are generated for each of the words. Offline recognition determines the hypothetical pronunciations with a good acoustical match to the audio data likely to contain the words. The matching pronunciations are aggregated and adjudicated to select new pronunciations for the words to improve general or personalized recognition models.

Figure 1:
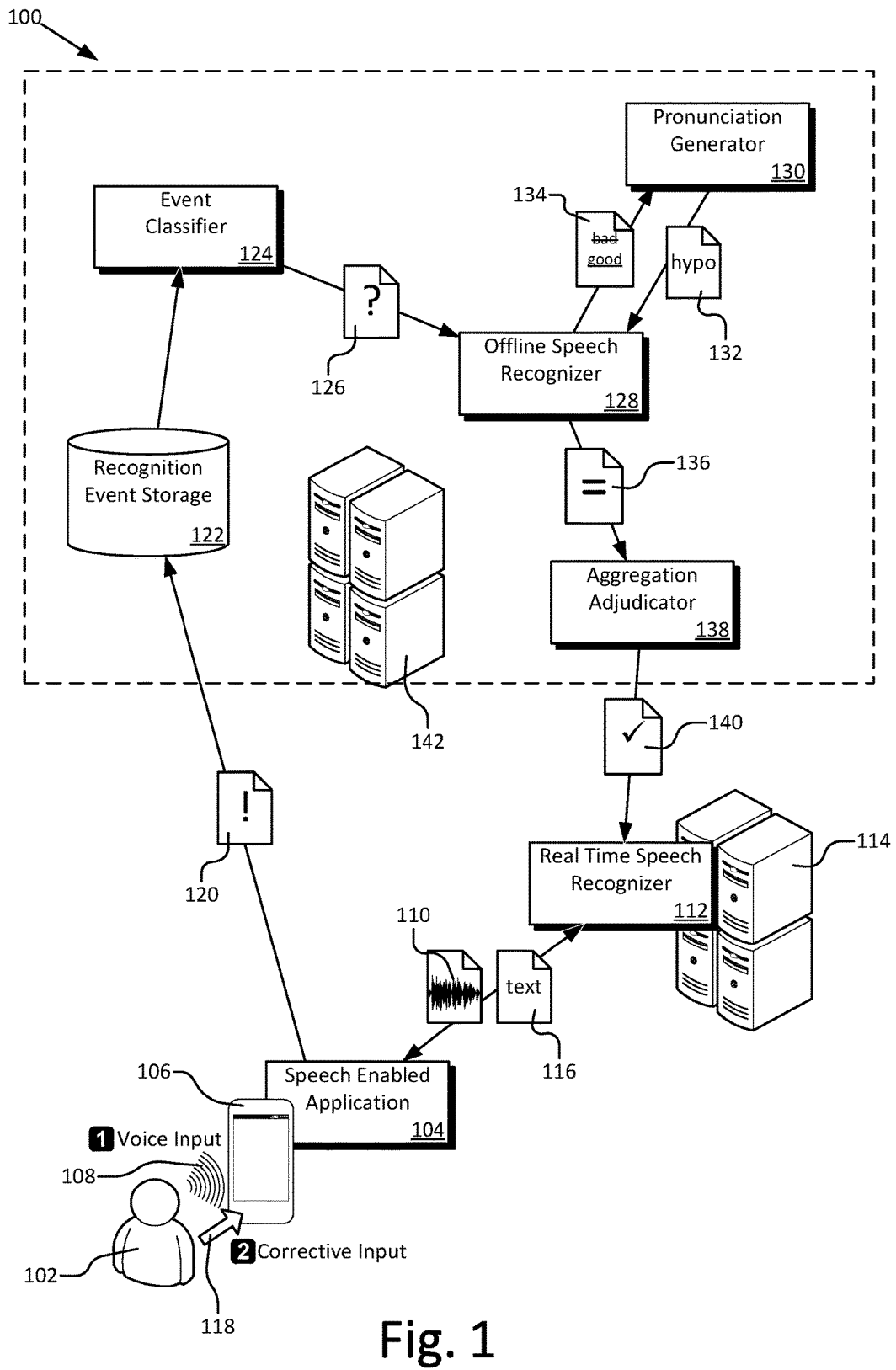
FIG. 1 illustrates one embodiment of a new pronunciation learning system that dynamically learns new pronunciations for misrecognized words assisted by implicit or explicit user-supplied corrections.

FIG. 1 illustrates one embodiment of a new pronunciation learning system that dynamically learns new pronunciations for misrecognized words assisted by implicit or explicit user-supplied corrections. The new pronunciation learning system 100 collects and processes recognition event data from speech recognition transactions to dynamically improve speech recognition. In one usage scenario, a user 102 interacts with a speech-enabled application 104 running on a client device 106. The speech-enabled application and the client device provide the user interface (i.e., frontend) of the speech recognition system. At a minimum, the client device includes a processor for running applications (e.g., an operating system and the speech-enabled application), a memory for storing applications and data, an audio input transducer (e.g., a microphone) for receiving voice inputs, and a video display (e.g., a screen) for sharing visual information.

The client device may optionally include a keyboard or keypad (physical or virtualized), a touch screen, and/or other input mechanisms, and may optionally include an audio output transducer (e.g., a speaker) and/or other output mechanisms. The speech-enabled application may be a multi-modal application that accepts other types of inputs in addition to voice inputs.

Examples of suitable client devices include, but are not limited to, laptop computers, desktop computers, mobile phones, personal digital assistants, smartphones, smartwatches, video game systems, smart appliances (e.g., smart televisions), navigation systems, and automotive entertainment systems (e.g., car radios). It should be appreciated that the client device may combine multiple component devices (e.g., a video game system and a television) to provide the minimum functionality.

The user begins a recognition event by speaking a voice input 108 (i.e., a spoken utterance) to the speech-enabled application. The audio data 110 (i.e., an audio file or stream) of the spoken utterance is transmitted to a real-time real-time (i.e., online) speech recognition system 112, which translates (i.e., recognizes or decodes) the speech into text. In the illustrated embodiment, the real-time real-time speech recognition system runs on a remote computing device 114. In other embodiments, the speech recognition system may run on the client device and process the spoken utterance locally.

The real-time speech recognition system decodes the audio data and returns the decoded text 116 to the speech-enabled application. The accuracy of the speech recognition is dependent on a variety of factors, such as the language model used by the real-time speech recognition system and the quality of the audio. If the real-time speech recognition system fails to properly recognize one or more words from the spoken utterance, the user does not receive the desired result from the speech-enabled application. As a result, the user resorts to making a subsequent corrective input 118. The corrective input may be supplied using another type of input, such as, but not limited to, typing, touch gestures, and menu navigation. The user may also attempt to alternative voice input techniques, such as speaking the letters to spell an incorrectly recognized word. After making the corrective input, the user receives an appropriate response from the speech-enabled application.

During this exchange, recognition event data 120 is generated and recorded (i.e., logged). A single recognition event covers the activities from the initial voice input until the task is successfully completed or abandoned. The recognition event data may be reported by the speech-enabled application and/or another application involved in the exchange (e.g., the real-time speech recognition system). The recognition event data is transmitted to and stored in a recognition event store 122. The recognition event data collected during the transaction includes, but is not limited to, the user's initial voice input, subsequent user inputs, and any action or selection by the user after receiving the response to the user input selection, and the audio data passed to the real-time speech recognition system. The recognition event data may be annotated with supplemental information including, but not limited to, time stamps and source identifiers allowing the information to be correlated and the event sequence to be reconstructed.

An event classifier 124 analyzes the recognition event data and identifies words from spoken utterances that are likely to have been incorrectly recognized and may benefit from re-recognition to learn new pronunciations, which may be used to improve future speech recognition transactions. In other words, the event classifier distills the event recognition data down to a set of misrecognized words and the corresponding audio data storing the spoken utterances for the misrecognized words. In various embodiments, the event classifier examines the recognition event logs to look for events that correspond to a misrecognized voice input leading to an unsuccessful result followed by one or more subsequent inputs that are repeats of the misrecognized voice input leading to a successful result. Whether the subsequent inputs are repeats of the misrecognized voice input may be determined based on factors such as, but not limited to, the similarity of the inputs and the appearance of infrequently used words in the decoded voice input. Whether the result is successful or unsuccessful may be determined based on whether or not the user interacts with the results returned by the speech-enabled application. Such a sequence of events constitutes a user-corrected misrecognition event 126.

The event classifier passes the recognition event data for corrected misrecognition events likely to involve the same misrecognized word to an offline speech recognition system 128. The offline speech recognition system performs re-recognition of the misrecognized voice input in view of the corrective input information. In various embodiments, the offline speech recognition system does not use the same language models used for general speech recognition. Instead, a language model with a custom grammar targeting the misrecognized word is used.

A pronunciation generator 130 generates the custom grammar 132. The pronunciation generator is conceptually analogous to a letter-to-sound module used in a text-to-speech engine. The custom grammar is a set of hypothetical pronunciations for the misrecognized word developed using word from the subsequent input 134. The hypothetical pronunciations may be constrained by spelling and other linguistic knowledge. Using the custom grammar, the offline speech recognition system decodes spoken utterances associated with the misrecognized word to obtain a matching pronunciation to potentially associate with the corrected word. In other words, the custom grammar limits the choices for the offline speech recognition system to a set of possible choices based on the words from the subsequent input (i.e., the words that are believed to have been said). In some embodiments, the custom grammar only contains possible pronunciations for the corrected word and only the misrecognized word is re-recognized.

The grammar produced by the pronunciation generator is intended to be exploratory and hypothetical to provide the offline speech recognition system with a much larger universe of possible pronunciations against which to compare the audio samples. The broader scope provided by the hypothetical pronunciations enables the offline speech recognition system to find matching pronunciations 136 for words that were misrecognized by the real-time speech recognition system using a general language model. When audio data providing multiple examples of the same misrecognized word as a spoken utterance are re-recognized using the hypothetical pronunciations, the top pronunciation selected by the offline speech recognition system may vary for different audio samples. As a result, a number of matching pronunciations may be found for the same misrecognized word. However, adding all of the matching pronunciations selected by the offline speech recognition system to the general language model may not be appropriate.

An aggregation adjudicator 138 is responsible for determining which, if any, matching pronunciations for the misrecognized word to accept. The aggregation adjudicator evaluates the set of re-recognition results and selects one or more matching pronunciations for use in the real-time speech recognition system. The aggregation adjudicator may simply select one or more of the most frequent matching pronunciations, for example, if those matching pronunciations are decisive winners. Where the best matching pronunciations are not clearly indicated by frequency, the aggregation adjudicator may analyze the matching pronunciations to identify the individual phonetic components appearing most frequently in the matching pronunciations for each written component (i.e., letter or letter group). A match between the individual phonetic components making up the top matching pronunciation and the most frequent individual phonetic components from all matching pronunciations provides an indication that the top matching pronunciation is the most correct pronunciation. This allows the aggregation adjudicator to accept the top matching pronunciation even if the top matching pronunciation is not a decisive winner by majority vote. The accepted pronunciations 140 are incorporated into the language model of the real-time speech recognition system to improve future recognition accuracy or to add a new word to the language model that was not previously in it, for example, for trending/topical words.

The recognition event store, the event classifier, the offline speech recognition system, the pronunciation generator, and the aggregation adjudicator may all be maintained or executed on the same computer system 142 or on one or more separate computer system (i.e., distributed systems). The computer systems may be implemented as individual computing devices (e.g., servers) or computing devices farms (e.g., server farms). Distributed computer systems may communicate via one or more networks, such as, but not limited to, the Internet, wide area networks, local area networks, and personal area networks. In various embodiments, any or all of the speech-enabled application, the real-time speech recognition system, the recognition event store, event classifier, the offline speech recognition system, the pronunciation generator, and the aggregation adjudicator may be executed on the same computer system.

Figure 2:
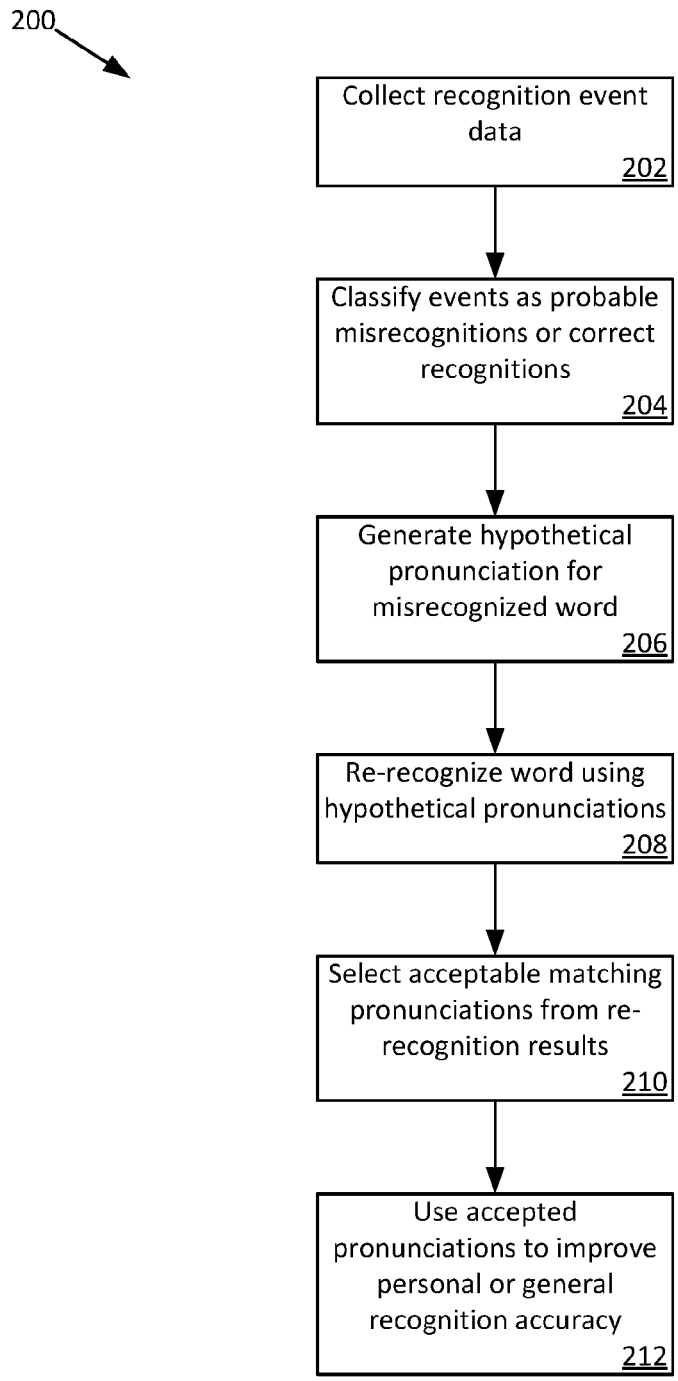
FIG. 2 is a high level flowchart of one embodiment of the new pronunciation learning method for dynamically learning new pronunciations for misrecognized words assisted by implicit or explicit user-supplied corrections.

FIG. 2 is a high level flowchart of one embodiment of the new pronunciation learning method for dynamically learning new pronunciations for misrecognized words assisted by implicit or explicit user-supplied corrections. The corrective speech recognition method 200 begins with a recognition event data collection operation 202 that builds a corpus of recognition event data containing information related to voice tasks initiated by the user. The recognition event data may include, but is not limited to, the audio data for the spoken utterance (i.e., the user voice input), the response from the real-time speech recognition system, and subsequent user inputs and selections implicitly or expressly confirming or rejecting the accuracy of the recognition and providing confirmation of the words intended by the user's spoken utterance. The collected recognition event data storage is added to a data repository for subsequent offline analysis.

An event classification operation 204 parses the recognition event data to locate recognition events that are reasonably likely to be associated with a misrecognition of the initial voice input by the real-time speech recognition system and includes subsequent information that may be used to find an corrective pronunciation for the misrecognized word. For example, the event classification operation bundles subsequent events such as a spoken query without selection of an offered link (i.e., click-through) followed within five seconds by a text query with click-through, identifies words or other linguistic units frequently occurring in the identified events likely to be misrecognized, and associates them with audio data likely to contain spoken utterances of the misrecognized words.

A pronunciation generation operation 206 generates a number of hypothetical pronunciations for a misrecognized word expected to be the embodied in the spoken utterance based on the differences between the decoded voice input and a similar subsequent input. The differences are likely to be a correction replacing the misrecognized word with the word intended by the user in the spoken utterance (i.e., the correct word). Thus, the hypothetical pronunciations are tailored specifically to optimize recognition of the words likely have been said in the spoken utterance. The pronunciation generation operation generates the hypothetical pronunciations by identifying possible written and phonetic unit pairings for the letters in the correct word. The pronunciation generation operation may produce a list of hypothetical pronunciations or a structured network containing permutations of possible written and phonetic unit pairings.

A re-recognition operation 208 re-recognizes the audio data for the corresponding spoken utterance using the hypothetical pronunciations for what are likely to be the correct words. Re-recognition using the hypothetical pronunciations provides a matching pronunciation based on an acoustical match; however, the matching pronunciation may represent an uncommon or incorrect pronunciation and must be adjudicated before being accepted as an official or correct pronunciation for the corresponding word.

An aggregation and adjudication operation 210 determines the most appropriate pronunciations, if any, to add to the general language model used for general recognition by the real-time speech recognition system. For statistically relevant numbers of re-recognition results for a misrecognized word, the aggregation and adjudication operation may select the most frequently recognized pronunciation, all pronunciations that are recognized more than a threshold number of times, or all pronunciations that are recognized in more than a threshold percentage of the re-recognition results as being a correct pronunciation. When dealing with small samples or inconclusive re-recognition results, the aggregation and adjudication operation may look for frequently recurring sequences within the matching pronunciations and deduce whether to accept the pronunciation from them. This recurring sequence matching sub-operation is discussed in reference to the example hypothetical pronunciation of FIG. 5.

An update operation 212 provides the accepted pronunciations selected by the aggregation and adjudication operation for use by the real-time speech recognition system to improve the recognition accuracy in future general recognition transactions (e.g., search engines or dictation systems) or in personalized recognition transactions (e.g., contact list matching).

FIG. 3 is a high level flowchart of one embodiment of the event classification operation 204. The event classification operation begins with a grouping operation 302 that groups recognition event data according to the source (e.g., from the same user). The source identifier used by the event classification operation simply needs to uniquely, not personally, identify the source. The event classification operation may also consider inactivity (e.g., excessive periods of delay) when grouping recognition events.

Overall the aim of the speech-enabled application is to provide task completion via voice, so unsuccessful (i.e., uncompleted) voice tasks provide a threshold indication that the spoken utterance may not have been properly recognized. A task completion assessment operation 304 produces successive input pairs corresponding to an unsuccessful voice task followed by a successful subsequent task from the recognition event groups. The definition of success may vary for different applications. For dictation of an e-mail or text message, the task may be considered successful when the user clicks the send button. For a search query, the task may be considered successful when the user selects one of the search results presented in response to the query. The measurement of success is generally independent of the input method.

From the recognition event groups, successive input pairs corresponding to an unsuccessful voice task followed by a successful subsequent task are produced. Because comparisons are made between textual data types, the voice input of the successive input pair is actually the decoded result returned by the real-time speech recognition system rather than the spoken utterance. In many instances, the successive input pair includes the initial voice input and the next input after the voice input, but other formulations of the successive input pair may be used. The voice input of the successive input pair may be a subsequent voice input in a single recognition event rather than the initial voice input. Additionally, the subsequent input of the successive input pair may not be the input immediately following the voice input. In other words, one or more intermediate inputs from the recognition event group may be ignored. Further, multiple successive input pairs may be generated for a single recognition event group for some or all of possible combinations when more than one voice input and/or more than one subsequent input are part of the single recognition event group.

The following description provides a simple example of a single recognition event in a web search application:

1. The user initiates a voice query and says "west elm palo alto."
2. The real-time speech recognition system returns "western palo alto" to the speech-enabled application.
3. The speech-enabled application presents search results for the query "western palo alto," but the user does not select any of the search results.
4. Within a short time frame, the user initiates a text query and types "west elm palo alto."
5. The speech-enabled application presents search results for the query "west elm palo alto."
6. The user selects one of the search results presented by the speech-enabled application, for example, to visit a web site or receive directions.

In this scenario, success (or failure) is measured at the fourth and sixth activities. The event classifier determines that the voice query was not successful because the user quickly issued a new query without selecting any of the search results from the initial search query. Similarly, the event classifier determines that the second query was successful because the user selected one of the search results. Failure of a first task followed closely in time by a successful second task may be used as a threshold to determine whether a potential misrecognition has occurred and further analysis of the activities is warranted. What constitutes a short time frame or close in time is generally application specific. For example and without limitation, within 20 seconds or within 60 seconds may be a short time frame in the context of a web search.

The recognition event data for this scenario might be logged as:

01/04/2014 12:02:15 pm Voice AudioID:1234
  01/04/2014 12:02:17 pm Recognition "western palo alto"
  01/04/2014 12:02:28 pm Text "west elm palo alto"
  01/04/2014 12:02:34 pm Selection Result:<selected url>.

The successive input pair may be represented as: "western palo alto"→"west elm palo alto."

When a potential misrecognition has been identified, a misrecognition determination operation 306 uses the results of the various feature assessments to evaluate the relationship between the inputs and decide whether or not to classify the event as a probable misrecognition. In various embodiments, the probable misrecognition event determination may consider factors (e.g., session, lexical, and phonetic features) to evaluate the similarity of the successive inputs. A high level of similarity between a speech recognition input initiating an unsuccessful task and a contemporaneous subsequent input initiating a successful task indicates a probable misrecognition of the spoken utterance. Depending upon the nature of the speech-enabled application and the types of utterances received, syntactical and/or morphological features may also be used when assessing similarity.

Session features provide statistical information used to evaluate the relationship between the inputs of successive input pairs and the significance of a successive input pairs. Session features include, but are not limited to, the occurrence frequency of a particular successive input pair, the occurrence frequency of successive input pair, and the time between the successive inputs. For example, the likelihood that a recognition problem is directly related to the number times that the successive input pair "western palo alto"→"west elm palo alto" appears in the event data. Further, the frequent occurrence of the inverse successive input pair "west elm palo alto"→"western palo alto" in the event data is an additional indicator that a misrecognition problem exists. Additionally, a recognition result that contains an infrequently used word may be a misrecognition indicator. Finally, as more time elapses between the successive inputs, it may be less likely that the successive inputs are related. In the sample recognition event given above, less than 20 seconds is used as an example of a short time frame. Additionally, some embodiments may check to see if keywords in documents or document summaries (e.g., the web pages or snippets) from results selected by the user match words in a successful query from a subsequent input.

Lexical features (e.g., the number of overlapping words) are indicative of the similarity between the inputs of successive input pairs. For example, even if submitted in close temporal proximity, the inputs of the successive input pair "western palo alto"→"show traffic conditions" are lexically different and more likely indicate that the user switched to a new task before completing the previous task rather than indicating that the voice input was misrecognized. On the other hand, the successive input pair "western palo alto"→"west elm palo alto" has significant word overlap.

Phonetic features are also indicative of the similarity between the inputs of successive input pairs. Inputs that do not appear similar in written form could be indeed very close in the spoken form. For example, the phonetic similarity of the successive input pair "western palo alto"→"west elm palo alto" is even greater than the lexical similarity. In another example, the inputs of the successive input pair "hemphill"→"temple" have no word overlap and are not lexically similar, but they are very similar phonetically. Examples of suitable phonetic algorithms for measuring phonetic similarity include, but are not limited to, implementations of Soundex and Metaphone.

The features used in determining whether the inputs are related to a misrecognized utterance (word) may vary in number, weighting, and order of application. Some formulations may give greater weight to linguistic similarity measures to find possible misrecognitions where the user is interrupted when receiving results based on the decoded spoken utterance and experiences a long delay before making the corrective subsequent input. In other embodiments, linguistic similarity measures may be given less weight when there is a long delay between receiving results based on the decoded spoken utterance and making a subsequent input. Likewise, the order or balance between linguistic similarity measures may vary. For example, high phonetic similarity alone in contemporaneous inputs may be considered a strong indicator a misrecognized spoken utterance (e.g., "hemphill"→"temple").

In various embodiments, the complete recognition event data corpus is analyzed and all recognition event data related to the same predicted intended word is compiled and sent to the offline speech recognition system for re-recognition. In other embodiments, the recognition event data for individual misrecognized spoken utterances is sent to the offline speech recognition system for re-recognition as it is identified, particularly, in the case of personalized pronunciation learning.

When a successive input pair is found to be semantically related to each other and both inputs of the successive input pair are spoken utterances, an optional acoustic verification operation 308 may acoustically compare the spoken utterances to verify that the spoken utterances are consistent. In other words, the acoustic verification operation checks that the speaker is saying the input in the same way in both inputs. For example, if the first spoken utterance contains a misrecognition, the speaker may incorrectly pronounce the misrecognized portion in a way that the speakers thinks will help the speech recognition system when making the second spoken utterance. Spoken utterances which are acoustically inconsistent may not be considered reliable due to the incorrect pronunciation and may result in the successive input pair being discarded as a potential misrecognition event.

In various embodiments, the portions of the successive inputs that are the same are considered to be properly recognized and are not re-recognized. For example, the words "palo alto" appearing in both inputs of the successive input pair "western palo alto"→"west elm palo alto" are not re-recognized.

FIG. 4 is a high level flowchart of one embodiment of the pronunciation generation operation 206. The pronunciation generation operation includes a graphone mapping operation 402 discovers the range of potential pairings of letters and sounds in a particular language (e.g., graphones). The pairings make up the grammar (i.e., dictionary) to translate a spoken utterance into written form (i.e., text). The letters may include, without limitation, letters, graphemes, other graphic units, or sequences of thereof. The sounds may include, without limitation, phones, phonemes, other phonetic units, or sequences thereof. In other words, various letter-to-sound pairings, such as, but not limited to, one-to-one or many-to-one pairings (e.g., a digraph to a single phoneme). Examples of English language one-to-one pairings are letter-p:phoneme-p or letter-t:phoneme-NULL (as in "ballet") and many-to-one pairings are letter-t+h:phoneme-θ (as in "thumb") and letter-g+h:phoneme-f (as in "rough"). For convenience, a graphone is intended to broadly encompass any such pairing used by the new pronunciation learning system.

A language modeling operation 404 creates a language model to predict common sequences of the graphones for the language being spoken. The model captures language-specific patterns and pronunciation constraints (e.g., due to syllable structure). An example of a language-specific pattern is that the graphone letter-c:phoneme-s frequently occurs before the letters i, e, or y and may be modeled in terms of the graphone letter-c:phoneme-s coming before graphones including i, e, or y. An example of pronunciation constraints is graphones mapping letter-y to a vowel are more probable than graphones mapping letter-y to a consonant when appearing between two graphones with consonant sounds and are modeled in terms of greater weight being given to the graphones mapping letter-y to a vowel.

An optional graphone sequence scoring operation 406 selects hypothetical pronunciations for the custom grammar. The graphone sequence scoring operation may be used to limit the number of different matching pronunciations possible to be selected during re-recognition. For example, the custom grammar may be limited to a reasonable number of the highest scoring hypothetical pronunciations if the total number of hypothetical pronunciations is excessive. Alternatively, extremely low probability hypothetical pronunciations and/or hypothetical pronunciations violating linguistic rules may be excluded from the custom grammar.

Figure 5:
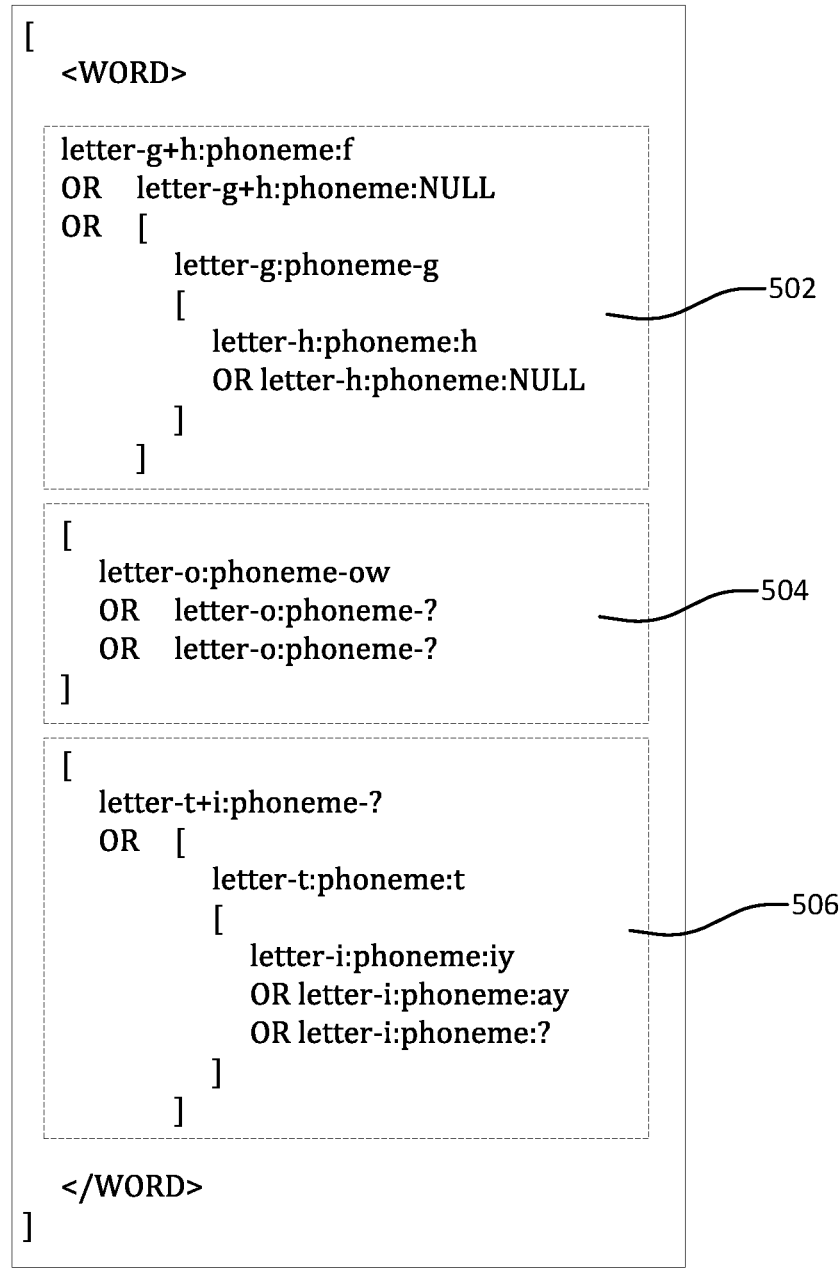
FIG. 5 illustrates hypothetical pronunciations for the input "Ghoti" expressed in graphones produced using by one embodiment of the graphone mapping operation.

FIG. 5 illustrates hypothetical pronunciations for the input "Ghoti" expressed in graphones produced using by one embodiment of the graphone mapping operation. The first section 502 maps possible sounds applicable to the letters G and H, individually and collectively. The second section 504 maps possible sounds applicable to the letter O. The final section 506 maps possible sounds applicable to the letters T and I, individually and collectively.

When all the permutations are considered, there are multiple possible alignments of graphones to the input "Ghoti." Some are highly improbable and are expected to be given very low weights in the language model. For example, any pronunciation starting with the graphone letter-g+h: phoneme-f should be heavily discounted by the language model because this graphone only occurs in certain environments and definitely not at the beginning of words in the English language. In contrast, pronunciations based on more conventional graphone mappings, such as "g ow t iy" and "g a t ay" should be highly scored by the language model. These probabilities may be used to discard low-probability mappings or as weighting factors used to bias the offline speech recognition system towards more probable pronunciations.

TABLE 1

Sample re-recognition results for GHOTI

| Pronunciation | Frequency |
| --- | --- |
| g:g h:NULL o:ow t:t i:iy | 4 |
| g:g h:NULL o:a t:t i:ay | 2 |
| g + h:NULL o:a t:t i:iy | 1 |
| g + h:f o:ow t:t i:iy | 2 |

Continuing with the "Ghoti" example, Table 1 shows an example of re-recognition results illustrating the recurring sequence matching sub-operation of the aggregation and adjudication operation where the best matching pronunciation is not conclusively established based solely on the most frequently occurring matching pronunciation. The pronunciation "g ow t iy" is the winner, but hardly resoundingly given the small sample set. However, by looking for consistencies across all results, the individual graphones in the pronunciation "g ow t iy" are determined to be more popular than competing graphones. For example, the graphones letter-g:phoneme-g and graphone letter-h:phoneme-NULL appear significantly more times than the graphone letter-g+h:phoneme-NULL or the graphone letter-g+h:phoneme-f. Similarly, the graphone letter-o:phoneme-ow appears significantly more times than the graphone letter-o:phoneme-α, the graphone letter-i:phoneme-iy appears significantly more times than the graphone letter-i:phoneme-ay, and the graphone letter-t:phoneme-t has no competition. Based on the winners of the individual graphone comparisons for each letter, the pronunciation "g ow t iy" is confirmed to be best pronunciation.

In various embodiments, the aggregation and adjudication operation scores the individual graphones from re-recognition results by re-tracing the individual graphones through a graph of possible graphone sequences for the word and counting how often each graph node is traversed. Once all the re-recognition results have been processed, the pronunciation defined by the individual graphones on the most popular path is selected as the correct pronunciation. In some embodiments, a selected number of the top paths may be chosen to provide more than one correct pronunciation. (e.g., all paths meeting a threshold number or percentage of occurrences). This same tracing technique may be used by the pronunciation generator to generate a list of hypothetical pronunciations.

The aggregation and adjudication operation may also determine that none of the re-recognized pronunciations for a misrecognized should be accepted as correct. For example, none of the pronunciations may meet the threshold required for acceptance or be definitive winners even after individual graphone scoring.

Figure 6:
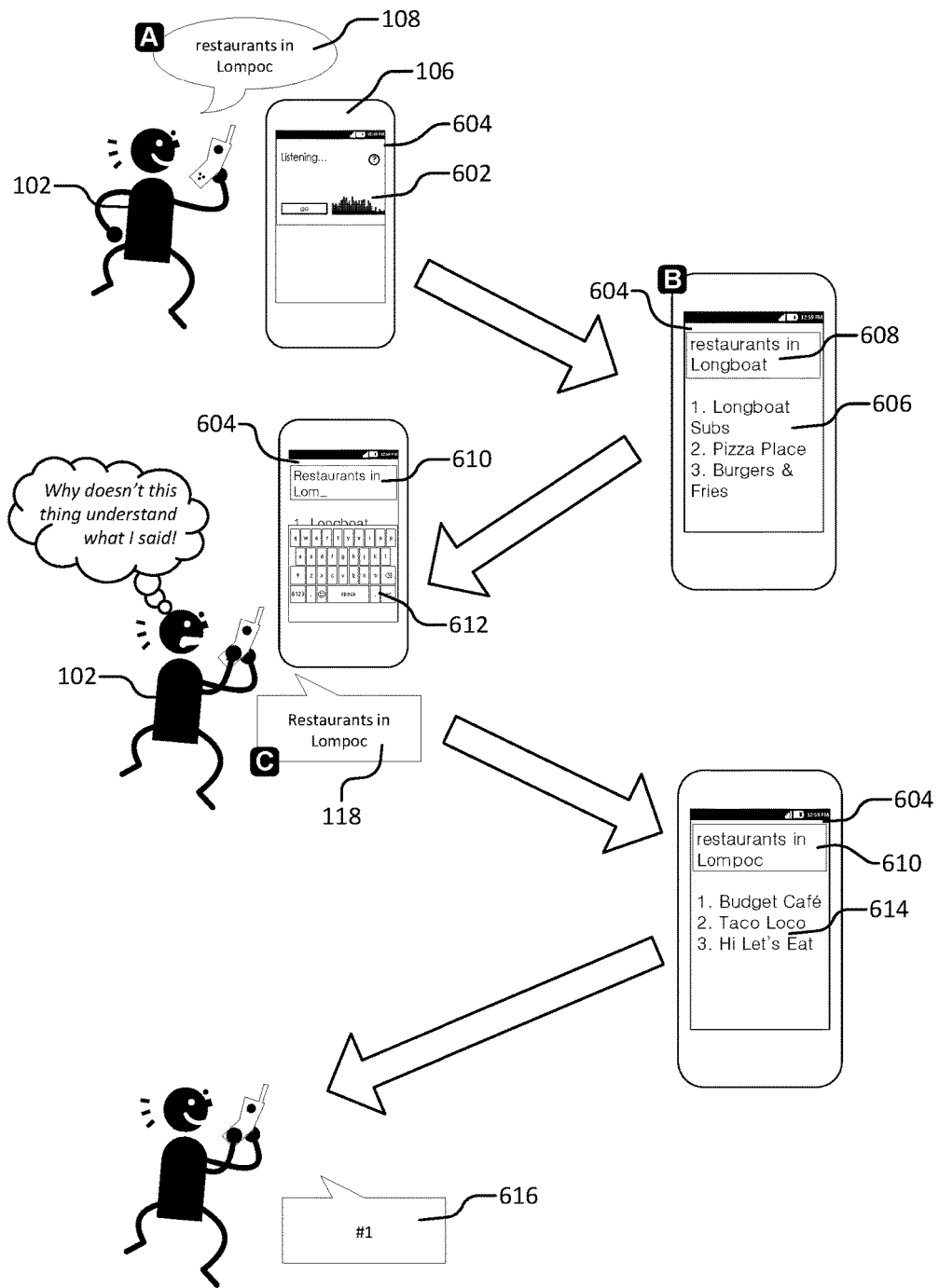
FIG. 6 illustrates one embodiment of the user interface of the new pronunciation learning system where a spoken utterance is misrecognized in a general recognition scenario.

FIG. 6 illustrates one embodiment of the user interface of the new pronunciation learning system where a spoken utterance is misrecognized in a general recognition scenario. The voice component 602 of the user interface 604 listens to a spoken utterance 108 made by the user 102 corresponding to a task for the speech-enabled application. The spoken utterance may be action with arguments (e.g., "find restaurants in Lompoc") or simply information the user wants to find (e.g., "find restaurants in Lompoc").

The user interface sends the spoken utterance to a speech recognition system for decoding and search results are obtained from a knowledgebase or other data source. However, in this instance the spoken utterance is incorrectly recognized due to the lack of an appropriate pronunciation for the city Lompoc in the general language model. The user interface displays bad or unexpected results 606 for "restaurants in Longboat" to the user based on the misrecognized voice input 608.

The now frustrated user does not select any of the bad results. Instead, the user resorts to editing or re-typing the query 610 with the correct city name using the virtual keyboard 612 of the user interface. Alternatively, the user might chose to try another spoken utterance spelling the city name (e.g., "restaurants in Lompoc, L-O-M-P-O-C") to get the intended results using the voice component of the user interface. In either case, the subsequent input 118 without selecting any of the offer results implicitly indicates that the spoken utterance was misrecognized or the search results were unsatisfying.

The user interface obtains new search results 614 for the subsequent query. This time, the user interface displays the results 608 for "restaurants in Lompoc" to the user based on the user's corrected input. The user is satisfied with the results, if not with the experience, and selects an offered link 616 via a touch gesture (e.g., a single tap) in the user interface. By selecting a link, the user implicit confirms that the new search results were intended and satisfactory.

FIG. 7 graphically illustrates the method of offline pronunciation learning through re-recognition for the scenario of FIG. 6. Behind the scenes, the speech-enabled application logs the data relating to this recognition event, such as a recording of the spoken utterance, the decoded voice input, the typed subsequent input, the search result selected by the user in response to typed subsequent input, together with a non-personal source identifier and the times of each event. Based on failure of the voice input and the success of the subsequent input, the close proximity in time between the inputs, the high degree of lexical and phonetic similarity between the misrecognized voice input and the subsequent input, the event classifier will determine that the two inputs are related and are a probable misrecognition due to unacceptable pronunciations in the general language model for the word "lompoc," which is the only difference 702 between the successful subsequent input and the failed voice input. Hypothetical pronunciations 704 and a custom grammar 706 for the word "Lompoc" are generated. The audio file 708 corresponding to the voice input is re-recognized using the custom grammar to match hypothetical pronunciations to the signal. The best match 710 from the hypothetical pronunciations is scored as the pronunciation for this recognition event. The process is repeated for other instances of the word "Lompoc" found in event recognition data. The results are aggregated 712. The top aggregated match is adjudicated as the new official pronunciation 714 and incorporated into the general language model. The second place match 716 may optionally be added as it is also occurs significantly more frequently than the next runner-up.

This process is unsupervised and occurs with only minimal human interaction. The primary human interaction is the implicit acceptance or rejection of the speech recognition results and implicit correction of the misrecognized voice input resulting from the typing of a new query.

Figure 8:
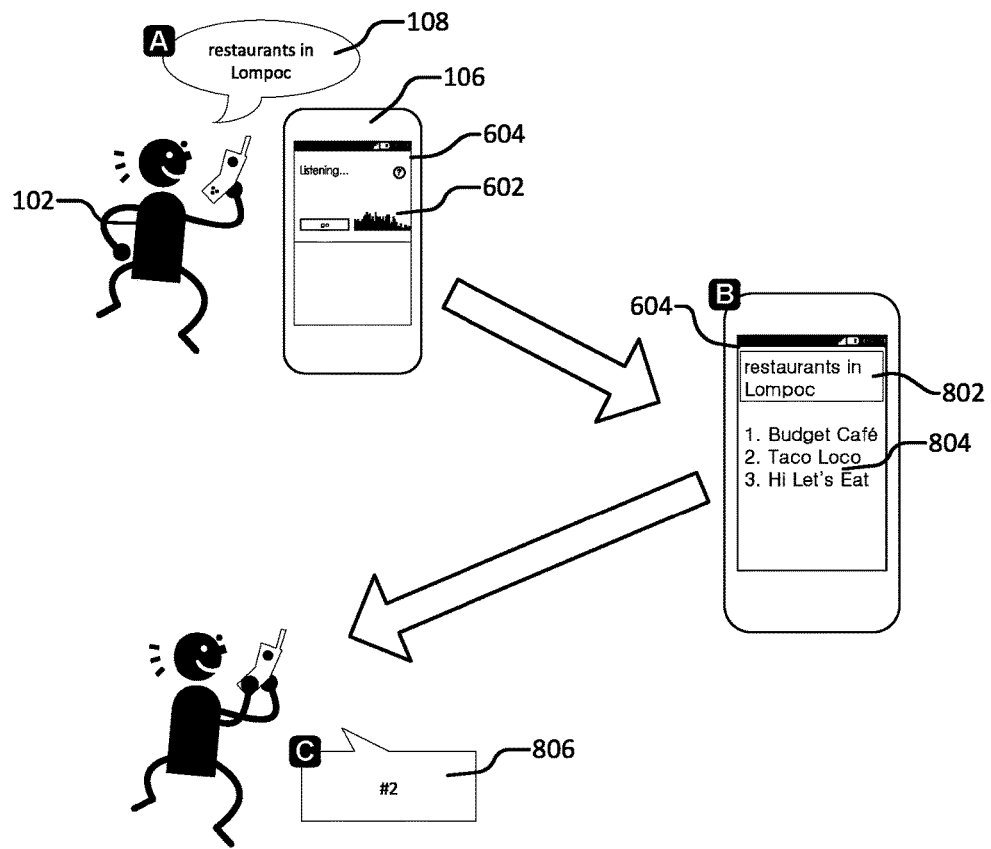
FIG. 8 illustrates one embodiment of the user interface of the new pronunciation learning system after learning the new pronunciation for the previously misrecognized word.

FIG. 8 illustrates one embodiment of the user interface of the new pronunciation learning system after learning the new pronunciation for the previously misrecognized word. Following the events of FIG. 7, the voice component 602 of the user interface 604 listens to a spoken utterance 108 made by the user 102 corresponding to a task for the speech-enabled application. The user interface sends the spoken utterance to a speech recognition system for decoding and search results are obtained from a knowledgebase or other data source. This time, the spoken utterance is correctly recognized due to the new pronunciation learned from re-recognition of a number of instances where "Lompoc" was misrecognized, but the user followed-up with a subsequent query correcting the mistake. The user interface displays the expected results 802 for "restaurants in Longboat" to the user based on the properly recognized voice input 804. The user is satisfied with the results and selects an offered link 806 via a touch gesture (e.g., a single tap) in the user interface. By selecting a link, the user implicit confirms that the new search results were intended and satisfactory. Thus, the word "Lompoc" is now accurately recognized using the updated general language model.

As previously mentioned, the new pronunciation learning system is applicable to personalized recognition scenarios. The speech-enabled application may explicit request confirmation of the pronunciations used in a personal language model. This may occur pre-emptively as having a bad pronunciation in text-to-speech synthesis often corresponds to having a bad pronunciation model for recognition. A common example of the need for personalized pronunciation correction is with names, which may the same spelling but be pronounced differently. This may apply to the user's name where an application speaks a personalized greeting or names of contacts in the user's contact book. A user wanting to perform a voice search for a contact may be frustrated when the actual pronunciation is not recognized and the user must remember to use an artificial pronunciation for the contact's name because the artificial pronunciation is what the speech-enabled contact application understands.

In a speech-enabled contact application, a newly added contact name (e.g., "Jonathon Teatime") may be immediately read back to the user (e.g., "jah-nuh-thuhn ti-taim"). The user is asked to verify that the pronunciation is correct. If it is not, the user is given the opportunity to speak the correct personalized pronunciation ("jah-nuh-thuhn te-ah-taim-eh"). The spelling and audio file logged and processed by the new pronunciation learning system as previously described. However, the aggregation adjudicator may have a diminished role if the new pronunciation is added only to the user's personal contact pronunciation grammar, as there is no need to aggregate the single, personal result. By default, the user's personal pronunciation is the winner.

In the foregoing discussion, specific linguistic terms such as "word" have been used to provide specific example of a linguistic unit for which a new pronunciation may be learned through re-recognition by embodiments of the present invention; however, the present invention is not limited to words and may learn new pronunciations for other linguistic units. Similarly, specific linguistic terms such as "graphone," "graphene," and "phoneme" are used to convey specific examples of the types of linguistic features that may be used by embodiments of the present invention; however, other graphic (i.e., written) or phonetic (i.e., sound) elements and pairings may be employed by the present invention to learn new pronunciations.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
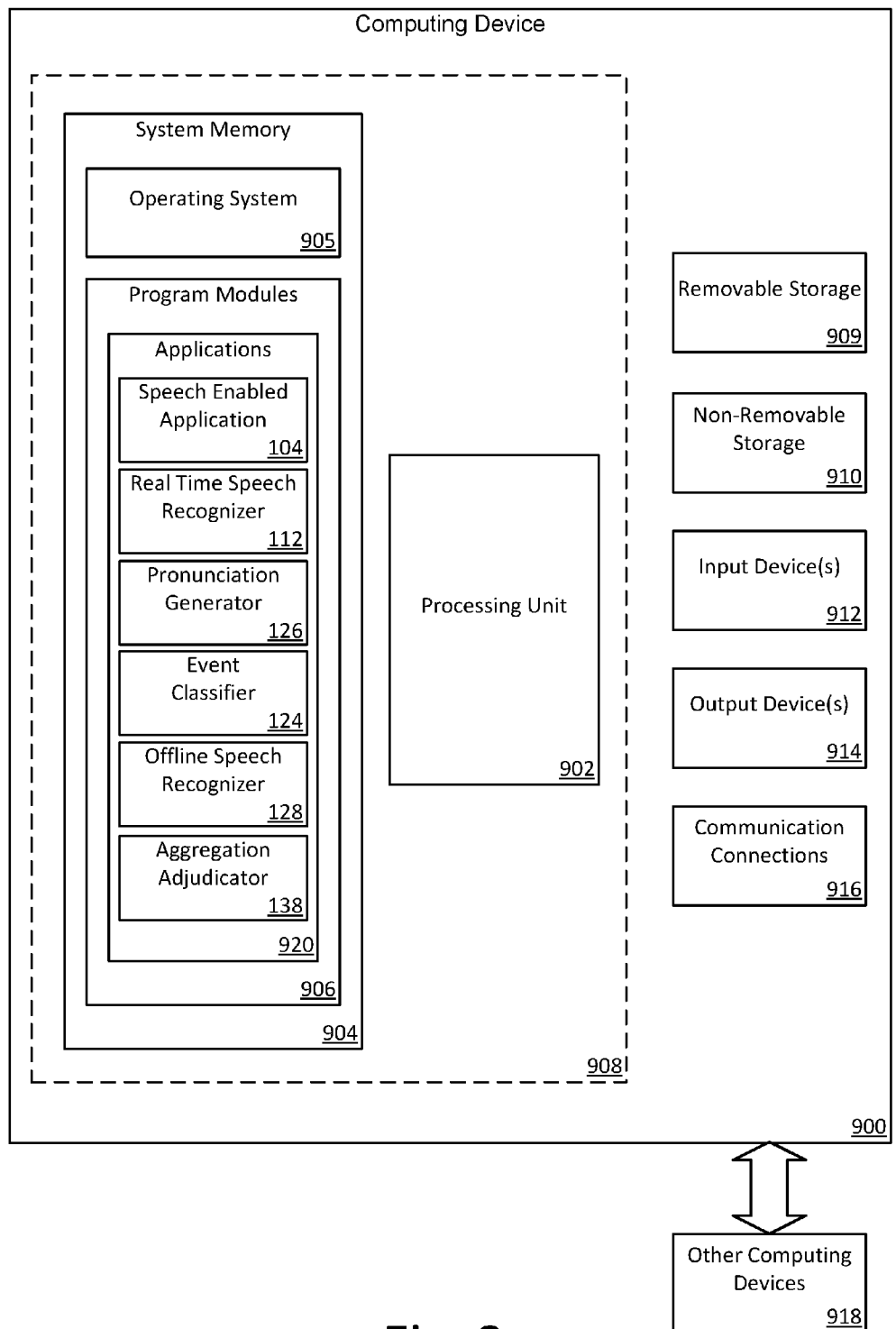
FIG. 9 is a block diagram illustrating one embodiment of the physical components of a computing device with which embodiments of the invention may be practiced.
Figure 10A:
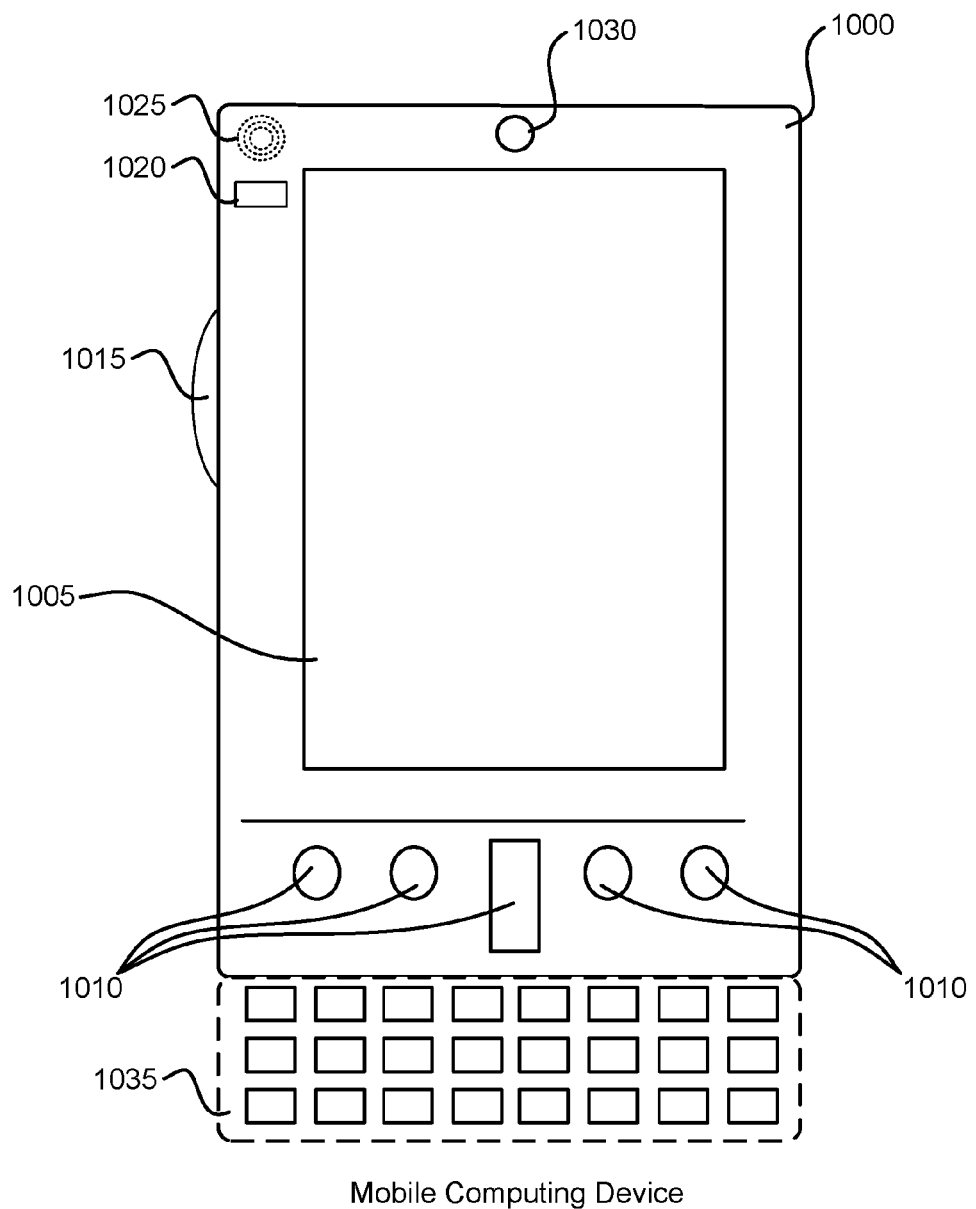
FIGS. 10A and 10B are simplified block diagrams illustrating a mobile computing device with which embodiments of the invention may be practiced.
Figure 10B:
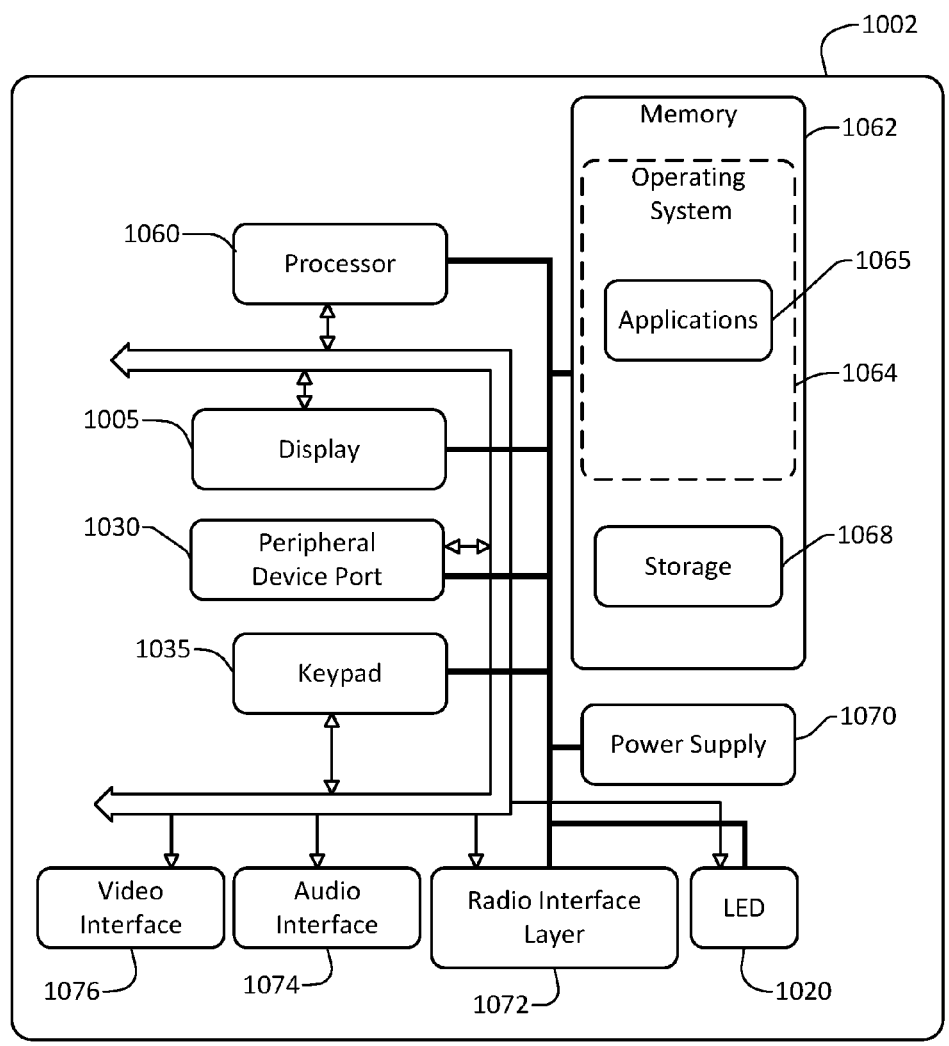
Figure 11:
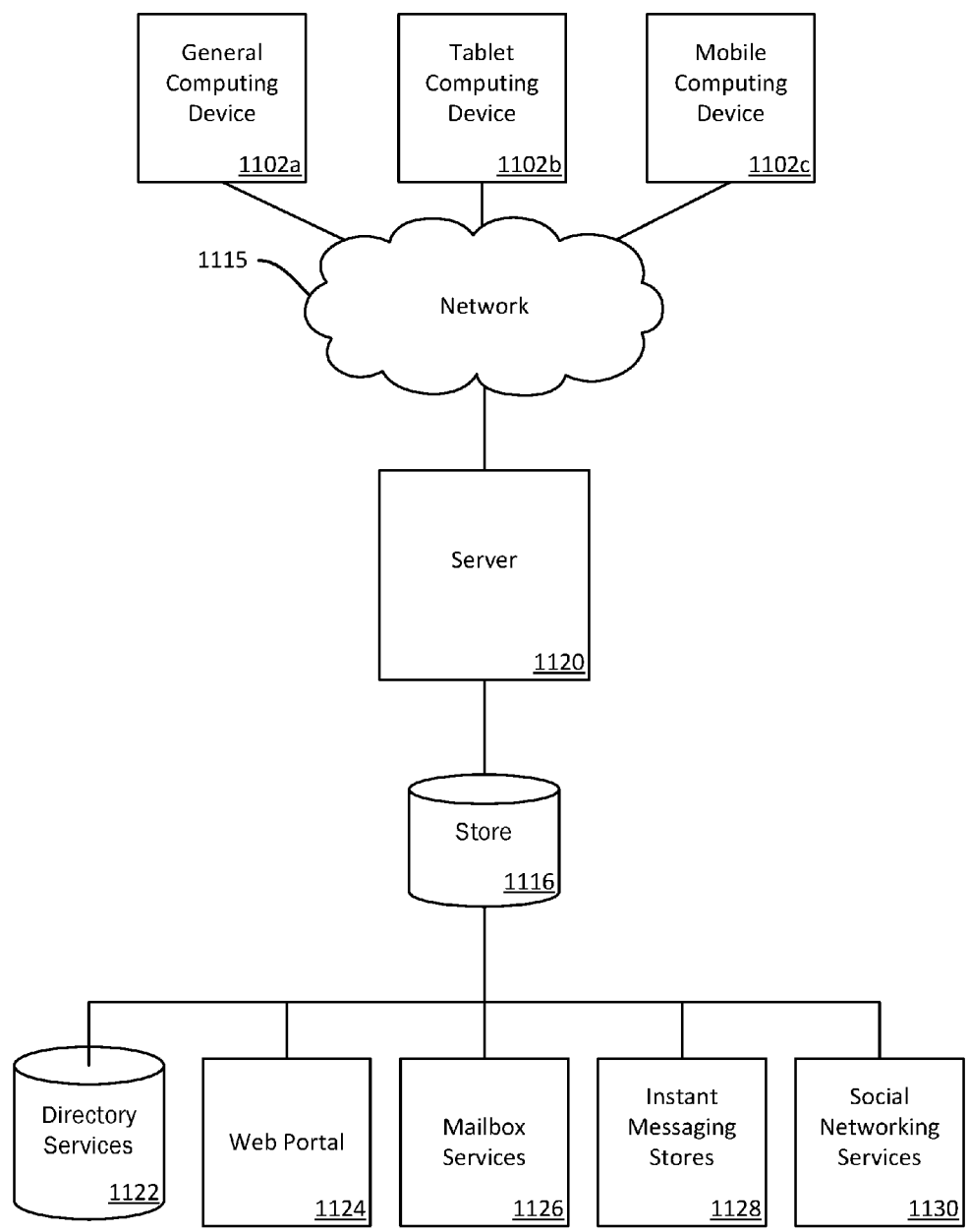
FIG. 11 a simplified block diagram of a distributed computing system illustrating one embodiment of the architecture of a system for providing new pronunciation learning functionality to one or more client devices.

FIGS. 9 through 11 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 9 is a block diagram illustrating one embodiment of the physical components (i.e., hardware) of a computing device 900 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software applications 920 such as the speech-enabled application 104, the real-time speech recognition system 112, event classifier 124, the offline speech recognition system 128, the pronunciation generator 126, and the aggregation adjudicator 138. For example, the operating system 905 may be suitable for controlling the operation of the computing device 900. Furthermore, embodiments of the invention may be practiced in conjunction with a graphics library, other operating systems, or any other application program and is not limited to any particular application or system. This basic configuration is illustrated by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated by a removable storage device 909 and a non-removable storage device 910.

As stated above, a number of program modules and data files may be stored in the system memory 904. While executing on the processing unit 902, the software applications 920 may perform processes including, but not limited to, one or more of the stages of the new pronunciation learning method 200. Other program modules that may be used in accordance with embodiments of the present invention may include electronic mail and contacts applications, word processing applications, spreadsheet applications, database applications, slide presentation applications, drawing applications, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 920 may be operated via application-specific logic integrated with other components of the computing device 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 900 may also have one or more input device(s) 912 such as a keyboard, a mouse, a pen, a sound input device, a touch input device, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900.

FIGS. 10A and 10B are simplified block diagrams illustrating a mobile computing device with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative embodiments, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface, a visual indicator 1020 (e.g., a light emitting diode), and/or an audio transducer 1025 (e.g., a speaker). In some embodiments, the mobile computing device 1000 incorporates a vibration transducer for providing the user with tactile feedback. In yet another embodiment, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1000 can incorporate a system (i.e., an architecture) 1002 to implement some embodiments. In one embodiment, the system 1002 is implemented as a smart phone capable of running one or more applications (e.g., browsers, e-mail clients, notes, contact managers, messaging clients, games, and media clients/players). In some embodiments, the system 1002 is integrated as a computing device, such as an integrated personal digital assistant (PDA) and wireless phone.

One or more application programs 1065 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1065 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including software applications described herein.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio 1072 that performs the function of transmitting and receiving radio frequency communications. The radio 1072 facilitates wireless connectivity between the system 1002 and the outside world via a communications carrier or service provider. Transmissions to and from the radio 1072 are conducted under control of the operating system 1064. In other words, communications received by the radio 1072 may be disseminated to the application programs 1065 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present invention, the microphone may also serve as an audio sensor to facilitate control of notifications, as will be described below. The system 1002 may further include a video interface 1076 that enables an operation of an on-board camera 1030 to record still images, video streams, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

FIG. 11 is a simplified block diagram of a distributed computing system illustrating one embodiment of the architecture of a system for providing new pronunciation learning functionality to one or more client devices, as described above. Content developed, interacted with, or edited in association with the software applications 920 may be stored in different communication channels or other storage types. For example, various documents may be stored using a directory service 1122, a web portal 1124, a mailbox service 1126, an instant messaging store 1128, or a social networking site 1130. The software applications 920 may use any of these types of systems or the like for enabling data utilization, as described herein. A server 1120 may provide the software applications 920 to clients. As one example, the server 1120 may be a web server providing the software applications 920 over the web. The server 1120 may provide the software applications 920 over the web to clients through a network 1115. By way of example, the client computing device may be implemented as the computing device 900 and embodied in a personal computer 1102a, a tablet computer 1102b, and/or a mobile computing device (e.g., a smart phone) 1102c. Any of these embodiments of the client device may obtain content from the store 1116.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for unsupervised learning of new pronunciations for speech recognition based on a plurality of recognition events, the method comprising:
   extracting a first recognition event from a plurality of recognition events, wherein the first recognition event comprises a failed voice task according to the plurality of definitions for one or more successfully completed tasks;
   extracting a second recognition event from the plurality of recognition events, wherein the second recognition event comprises a successfully completed task according to a plurality of definitions for one or more successfully completed tasks;
   determining the first recognition event as a misrecognized spoken utterance of at least one predicted intended word derived from the successfully completed task based at least in part on a plurality of features for misrecognition of speech;
   associating the misrecognized spoken utterance and the at least one predicted intended word based on at least one feature;
   generating at least one pronunciation from the misrecognized spoken utterance and the at least one predicted intended word;
   based at least in part on the at least one pronunciation, determining a new pronunciation; and
   applying said new pronunciation output for unsupervised learning to train speech recognition for processing subsequent voice recognition events.

2. The method of claim 1, wherein the definitions for one or more successfully completed tasks are statistically derived from the plurality of recognition events.

3. The method of claim 1, wherein the definitions for one or more successfully completed tasks comprise at least in part a speech misrecognition followed by a successful task completion within a threshold time.

4. The method of claim 1, wherein the definitions for one or more successfully completed tasks comprise at least in part receiving user interaction on a send button of a messaging application after receiving at least one spoken utterance.

5. The method of claim 1, wherein the definitions for one or more successfully completed tasks comprise at least in part receiving at least one selection on search results from user interactions after receiving at least one spoken utterance in a search application.

6. The method of claim 1, further comprising:
   compiling the at least one predicted intended word; and
   determine semantic similarity between the misrecognized speech utterance and the successfully completed task wherein the successfully completed task comprises at least one spoken utterance.

7. The method of claim 1, wherein the at least one definition of a successful task comprises at least one of:
   selecting through user interaction to proceed to a next action based on prior recognition events within a predetermined time period; and
   receiving a speech utterance without selecting a result of voice recognition from at least one previous recognition event.

8. The method of claim 1, wherein the at least one definition of misrecognition comprises at least one of:
   assessing misrecognition probability using session features of the failed voice task and the successfully completed task;
   assessing misrecognition probability using lexical features of the failed voice task and the successfully completed task; and
   assessing misrecognition probability using phonetic features of the failed voice task and the successfully completed task.

9. The method of claim 1, wherein determining the first recognition event as the misrecognized spoken utterance of the at least one predicted intended word further comprises determining based on similarity in the features between the failed voice task and the successfully completed task, and wherein the features comprise at least one of:
   session features;
   lexical features; and
   phonetic features.

10. The method of claim 9, wherein the session features further comprise at least one of:
    occurrence of the first recognition event followed by the second recognition event;
    occurrence of an inverse successive input pair, wherein the inverse successive input pair comprises the first recognition event occurring after the second recognition event; and
    occurrence of the second recognition event, wherein the second recognition event further comprising at least one of infrequently used word.

11. The method of claim 9, wherein the similarity in phonetic feature weighs more than the similarity in lexical feature.

12. The method of claim 9, further comprising comparing acoustic features of the failed voice task and the successful task.

13. A system for unsupervised learning of new pronunciations for speech recognition based on a plurality of recognition events, the system comprising:
    at least one processing unit; and
    at least one memory storing computer executable instructions that when executed by the at least one processing unit perform a method for automatically processing misrecognition of voice input, the method comprising:

parsing a series of user interaction events related to voice recognition;
determining a voice misrecognition when the series of user interaction events, wherein the determining the voice misrecognition further comprises:
receiving a first query, wherein the first query is at least in part a speech utterance;
encoding the first query into at least one text data;
providing the at least one text data; and
receiving a second query without selecting the provided at least one text data within in a predetermined time period;
determining the first query as a misrecognized spoken utterance of at least one predicted intended word derived from the second query;
associating the misrecognized spoken utterance and the at least one predicted intended word based on at least one feature;
generating at least one pronunciation from the misrecognized spoken utterance and the at least one predicted intended word;
based at least in part on the at least one pronunciation, determining a new pronunciation; and
applying said new pronunciation output for unsupervised learning to train speech recognition in processing subsequent voice recognition events.

14. The system of claim 13, further comprising:
encoding the second query into at a second text data when the second query is non-text data;
generating a level of similarity between the at least one text data and the second query; and
determining the first query as a misrecognized spoken utterance of at least one predicted intended word based on the second query when the level of similarity is greater than a threshold level.

15. The system of claim 14, wherein determining the first query as the misrecognized spoken utterance of the at least one predicted intended word further comprises comparing for similarity in the features between the first query and the second query, and wherein the features comprise at least one of:
session features;
lexical features; and
phonetic features.

16. The system of claim 15, wherein the session features further comprise at least one of:
occurrence of the first query followed by the second query within a temporal proximity;
occurrence of an inverse successive input pair, wherein the inverse successive input pair comprises the first query occurring after the second query; and
occurrence of the second query, wherein the second query further comprises at least one word, wherein the at least one word appears in the series of user interaction events at a frequency that is less than a threshold frequency.

17. The system of claim 15, further comprising comparing acoustic features of the first query and the second query.

18. A computer-readable storage device with a memory storing computer executable instructions which, when connected to and executed by at least one processor, perform a method for unsupervised learning of new pronunciation based on voice input, the method comprising:
extracting a first recognition event from a plurality of recognition events, wherein the first recognition event comprises a failed voice task according to the plurality of definitions for one or more successfully completed tasks;
extracting a second recognition event from the plurality of recognition events, wherein the second recognition event comprises a successfully completed task according to a plurality of definitions for one or more successfully completed tasks;
determining the first recognition event as a misrecognized spoken utterance of at least one predicted intended word derived from the successfully completed task based at least in part on a plurality of features for misrecognition of speech;
associating the misrecognized spoken utterance and the at least one predicted intended word based on at least one feature;
generating at least one pronunciation from the misrecognized spoken utterance and the at least one predicted intended word;
based at least in part on the at least one pronunciation, determining a new pronunciation; and
applying said new pronunciation output for unsupervised learning to train speech recognition in processing subsequent voice recognition events.

19. The computer-readable storage device of claim 18, wherein determining the first recognition event as the misrecognized spoken utterance of the at least one predicted intended word further comprises determining based on similarity in the features between the first recognition event and the second recognition event, and wherein the features comprise at least one of:
session features;
lexical features; and
phonetic features.

20. The computer-readable storage device of claim 18, wherein the session features further comprise at least one of:
occurrence of the first recognition event followed by the second recognition event within a temporal proximity;
occurrence of an inverse successive input pair, wherein the inverse successive input pair comprises the first recognition event occurring after the second recognition event; and
occurrence of the second recognition event, wherein the second recognition event further comprising at least one word, wherein the at least one word appears in the plurality of recognition events at a frequency that is less than a threshold frequency.

* * * * *